United States Patent [19]
Kyker et al.

[11] 3,843,596
[45] Oct. 22, 1974

[54] STABILIZED PHOSPHONITRILE ELASTOMERS

[75] Inventors: Gary Stephen Kyker, Uniontown; Joseph Alfred Beckman, Akron; Adel Farhan Halasa, Bath; James Edward Hall, Barberton, all of Ohio

[73] Assignee: Firestone Tire & Rubber Company, Akron, Ohio

[22] Filed: May 10, 1973

[21] Appl. No.: 359,034

[52] U.S. Cl....... 260/45.75 R, 260/2 P, 260/45.7 R, 260/45.75 B
[51] Int. Cl....................... C08g 51/56, C08g 51/62
[58] Field of Search.......... 260/2 P, 45.75 R, 551 P, 260/37 N, 23 R, 45.7 R; 117/161 UA

[56] References Cited
UNITED STATES PATENTS

| | | | |
|---|---|---|---|
| 2,629,700 | 2/1953 | Caldwell et al. | 260/23 |
| 3,271,330 | 9/1966 | Evans | 260/2 |
| 3,321,423 | 5/1967 | Scullin et al. | 260/23 |

OTHER PUBLICATIONS

Chemistry and Engineering, April 22, 1968, periodical, pp. 68–81.

*Primary Examiner*—V. P. Hoke

[57] ABSTRACT

The stabilization of phosphazene polymers against degradation when exposed to temperatures of about 275°F or higher, in air is achieved by the addition of controlled amounts of stabilizers to such phosphazene polymers, metal dialkyl-,alkyl-aryl-, or diaryl dithiocarbamates of zinc, lead or bismuth, or various inorganic or metallo-organic compounds, being preferred stabilizers.

7 Claims, 4 Drawing Figures

FIG. 1.

*— Zinc Dibutyl Dithiocarbamate
**— Zinc Dimethyl Dithiocarbamate

FIG. 3.

**— Bismuth Dimethyl Dithiocarbamate

FIG. 2.

\*\*\*—Zinc Diethyl Dithiocarbamate

FIG. 4.

STABILIZED PHOSPHONITRILE ELASTOMERS

This invention relates to the stabilization of phosphonitrilic elastomers, fibers and plastics against thermal degradation. The invention is applicable to the phosphonitrile fluoro-esters described in U.S. Pat. No. 3,271,330 (Evans) issued Sept. 6, 1966, the phosphonitrile polymers described in U.S. Pat. No. 3,370,020 (Allcock et al.) issued Feb. 20, 1968, the phosphonitrile elastomers described in U.S. Pat. No. 3,515,688 (Rose) issued June 2, 1970 and the phosphonitrile terpolymers, copolymers and homopolymers described in U.S. Pat. Nos. 3,702,833 (Rose et al.) issued Nov. 14, 1972 and 3,700,629 (Reynard et al.) issued Oct. 24, 1972 and to other polymers characterized by a repeating sequence of ($n = 3$ to $10,000$ or more) units in which various groups are attached to the P atoms, such groups including alkoxy, fluoroalkoxy, aryloxy, amino, arylakoxy, and other groups, and the phosphazenes described in a recent article on phosphazene chemistry in Chemical Reviews 1972, Volume 72, No. 4, particularly pages 349–356.

The polymers to which the present invention applies includes both elastomers and thermoplastic materials. Such polymers exhibit a number of desirable properties but are found to degrade when exposed in air to temperatures of the order to about 275°F or 300°F or higher for prolonged intervals of time.

A principal object of this invention is to modify such polymers by the addition thereto of controlled amounts of specified materials selected from the group consisting of metal oxides, hydroxides, carbonates, alkoxides, aryloxides and other organo-metallic compounds including particularly metal dialkyl-or diaryl-dithiocarbamates of divalent metals such as zinc, lead and bismuth.

The amount of stabilizer used depends to some extent on the stabilizer utilized, and on whether more than one stabilizer is used. In general the amount of stabilizer is as shown in the following Table:

Table I

| Stabilizer | Amount % |
| --- | --- |
| 1. Metal Dialkyl-, Alkylaryl-, or Diaryl Dithiocarbamates | 0.01 – 5 mol |
| 2. Group 1A Hydroxides or Carbonates | 0.01 – 3 mol |
| 3. Metal Oxides | 0.5 – 20 weight |
| 4. PVC Type Stabilizers (lead oxides, metal soaps and organotin mercaptides) | 0.25 – 6.0 weight |

The ranges above are in mol percent for addition agents which appear to exhibit an appreciable solubility in the material being stabilized and in weight percent for the stabilizers which appear to be insoluble in the material being stabilized.

The polymers to which the present invention is applicable are those in which alternating atoms of P and N form a polymeric chain which may be a straight chain, or a branched chain, or a cyclic structure, or a combination of any of these structures, halogen atoms or various other substituents being attached to the P atoms, e.g. as described in the patents noted above and in other literature on phosphonitrilic polymers.

One presently popular method for preparing such polymers involves first preparing $[NPCl_2]_x$ oligomers wherein $x$ is a small integer, and heating the oligomer to obtain higher molecular weight products. These products, are such, or after purification and upgrading, are then reacted with one or more suitable alkoxides, fluoralkoxides, aryloxides, or with other materials which replace some or all of the chlorine atoms in the polymer, with the reactive group of the alkoxide or other reactive group of the alkoxide or other reactant.

Whatever the reason for the tendency of the polymers to degrade when exposed to relatively moderate temperatures for prolonged time intervals, it has now been found that the incorporation of selectively small amounts of stabilizers into the reacted polymer produces products in which the thermal stability is greatly improved as compared with the unstabilized material. This invention applies also to fully compounded and cured stocks of these elastomers.

A particularly preferred class of stabilizers are the metal dithiocarbamates represented by one of the following formulae:

wherein M is a divalent metal selected from the group consisting of Zinc $^{+2}$ and Lead $^{+2}$; and each of $R_1$ and $R_2$ represents an alkyl or aryl group and $R_1$ and $R_2$ are not required to be the same.

FIGS. 1 to FIG. 4 are graphical representations showing the improvement in stability conferred in a copolymer in which $CF_3$—$CH_2O$— and $HF_2C(CF_2)_3CH_2O$— groups are randomly attached to the P atoms in a 1:1 ratio by the incorporation therein of small amounts of metal dialkyl dithiocarbamates and Group 1A Bases.

Tables I–XV present additional data illustrative of the invention.

Figure 1:
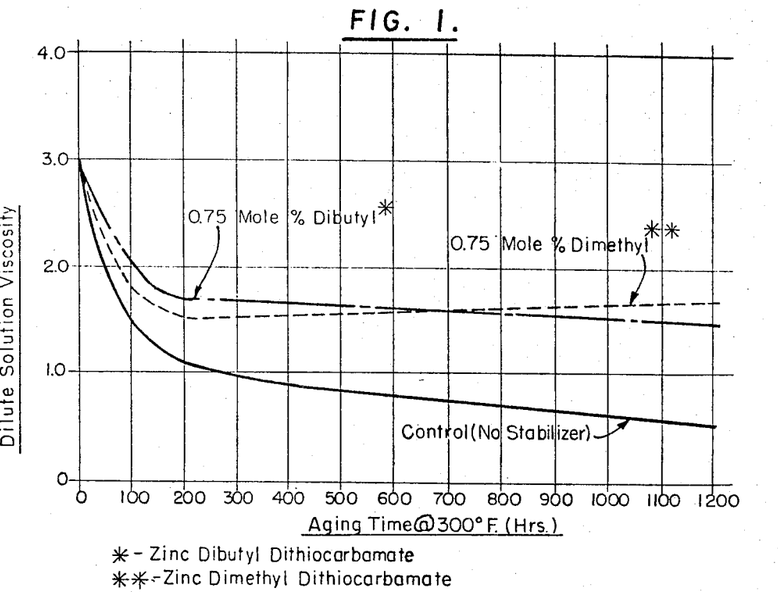
FIG. 1 is a graph illustrating the stabilization achieved in phosphazenes in which the groups attached to the phosphorus atoms are —$OCH_2CF_3$ and —$OCH_2(CF_2)_3CF_2H$ with the addition of 0.75 mole percent zinc dimethyldithiocarbamate and 0.75 mole percent zinc dibutyldithiocarbamate.
Figure 2:
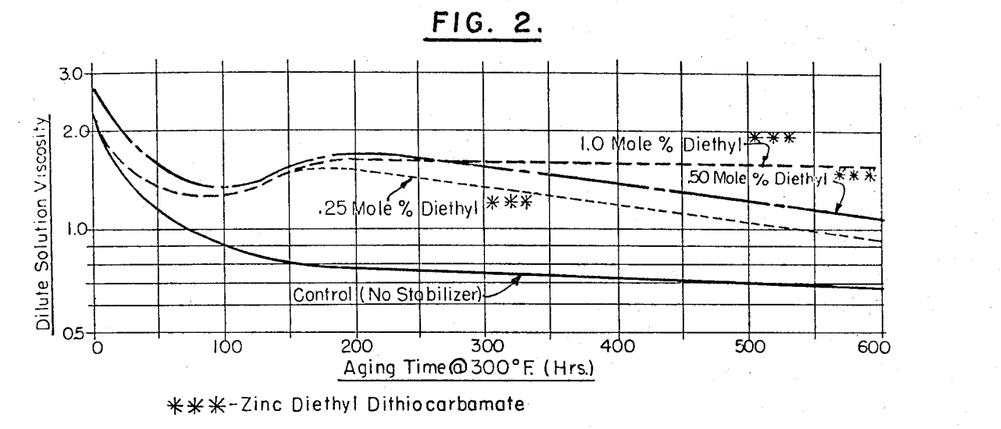
FIG. 2 is a similar graph illustrating the effect of the addition of various amounts of zinc diethyldithiocarbamate on the thermal degradation of the same polymer as that in FIG. 1.
Figure 3:
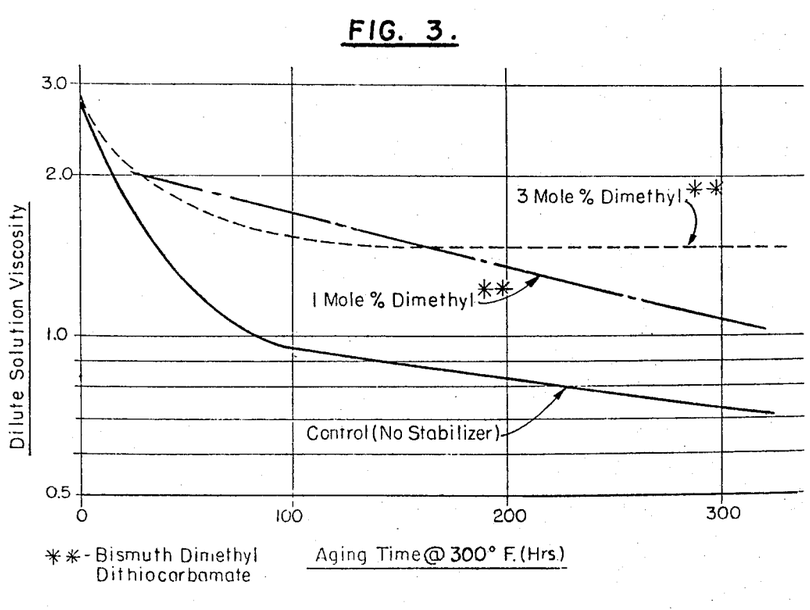
FIG. 3 is a similar graph showing the effect of the addition of various amounts of bismuth dimethyldithiocarbamate on the thermal degradation of the same type of fluoralkoxy phosphazene polymer.
Figure 4:
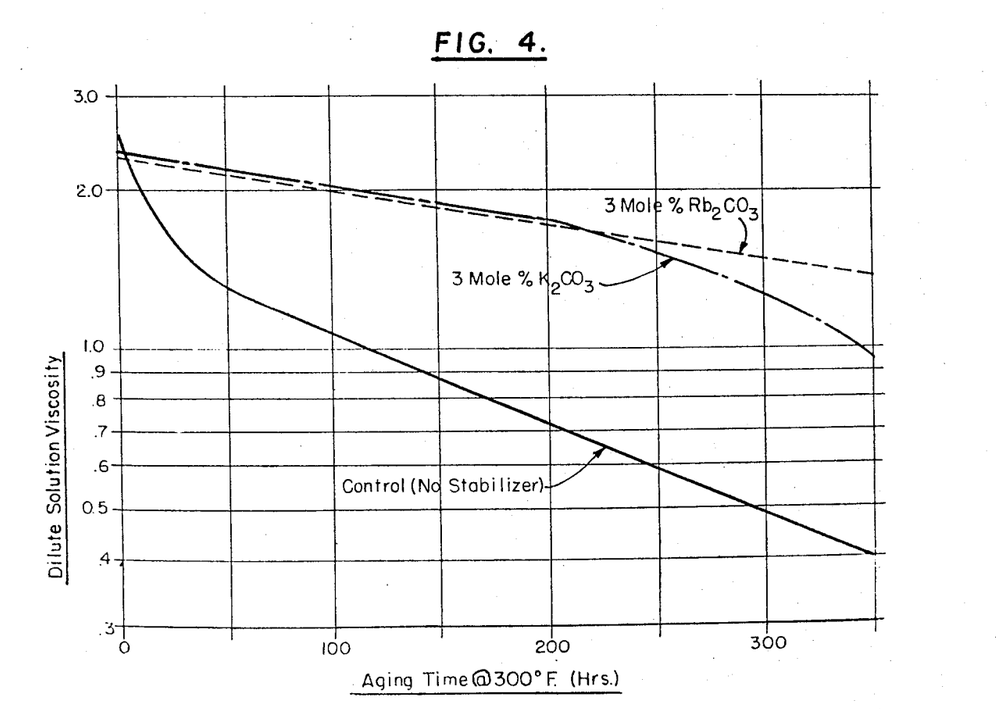
FIG. 4 is a similar graph showing the stabilization achieved by the addition of rubidium and potassium carbonates to the same phosphazene polymer.

Table 1 (See FIG. 1)

Aging of

Elastomer $(R=OCH_2CF_3, R'=OCH_2(CF_2)_3CF_2H)$

| Aging Time at 300°F (hours) | [DSV] Dilute Solution Viscosity | | | Physical State* | | |
|---|---|---|---|---|---|---|
| | I | II | III | I | II | III |
| 0 | 2.91 | 3.07 | 3.98 | E | E | E |
| 24 | 2.33 | 2.48 | 2.68 | E,SM | E | E |
| 53 | 1.64 | 2.10 | 2.14 | E,SM | E | E |
| 72 | 1.67 | 2.16 | 2.26 | M | E | E |
| 144 | 1.26 | 1.64 | 1.78 | M,F | E | E |
| 240 | 1.07 | 1.51 | 1.70 | M,F | E,SM | E,SM |
| 384 | 0.88 | 1.43 | 1.69 | M,F | E,SM | E,SM |
| 480 | 0.71 | 2.06 | 1.91 | M,F | E,SM | E,SM |
| 1104 | 0.63 | 1.67 | 1.50 | M,F | E,SM | E,SM |

I = Control - no addition
II = with 0.75 mol % zinc dimethyldithiocarbamate
III = with 0.75 mol % zinc dibutyldithiocarbamate
* Physical State
E = Elastomer
M = Melt
F = Flow
S = Slight

TABLE II.—DSV IN ACETONE

After aging $C_2^f$, $C_5^f$ (T) PFAP with various stabilizers

| Aging time at 300° F. (hrs.) | 28 | 31-1 | 31-2 | 31-11 | 31-12 | 31-13 | 31-14 | 31-15 | 31-16 | 31-17 | 31-18 | 20-3A | 26-7 | 26-8 | 26-9 | 26-10 |
|---|---|---|---|---|---|---|---|---|---|---|---|---|---|---|---|---|
| 0 | 2.88 | 2.81 | 2.69 | 2.89 | 2.75 | 2.80 | 2.75 | 2.86 | 2.64 | 2.78 | 2.68 | 3.03 | 3.44 | 3.77 | 3.87 | 3.62 |
| 23.3 | | | | | | | | | | | | 1.06 | 3.19 | 2.11 | 2.07 | 2.78 |
| 24 | 1.69 | 2.03 | 2.07 | 2.12 | 2.22 | 1.94 | 1.91 | 1.83 | 1.74 | 2.00 | 2.31 | | | | | |
| 42.3 | | | | | | | | | | | | 0.71 | | | | |
| 48 | 1.08 | | | | | | | | | | | | | | | |
| 62.8 | | | | | | | | | | | | | 2.66 | 2.16 | 1.72 | 2.24 |
| 87.8 | | | | | | | | | | | | | 2.53 | 1.99 | 0.79 | 3.64 |
| 96 | 0.95 | | | | | | | | | | | | | | | |
| 111.8 | | | | | | | | | | | | | 2.32 | 1.88 | 0.74 | 1.82 |
| 135.3 | | | | | | | | | | | | 0.15 | | | | |
| 192 | 0.85 | | | | | | | | | | | | | | | |
| 207.0 | | | | | | | | | | | | | 1.76 | 1.15 | 0.66 | 0.93 |
| 240 | 0.78 | 1.23 | 1.46 | 1.17 | 1.08 | 1.01 | 1.17 | 1.16 | 0.62 | 0.97 | 1.06 | | | | | |
| 360.0 | 0.78 | | | | | | | | | | | | | | | |

NOTE.—See Table III for Code.

Table III

| Sample Number | Dithiocarbamate Mole % | Dithiocarbamate |
|---|---|---|
| 28 | None | |
| 31-1 | 1.0 | bismuth dialkyl |
| 31-2 | 3.0 | bismuth dialkyl |
| 31-11 | 1.0 | lead dialkyl |
| 31-12 | 3.0 | lead dialkyl |
| 31-13 | 1.0 | zinc dimethyl |
| 31-14 | 3.0 | zinc dimethyl |
| 31-15 | 1.0 | zinc diethyl |
| 31-16 | 3.0 | zinc diethyl |
| 31-17 | 1.0 | zinc dibutyl |
| 31-18 | 3.0 | zinc dibutyl |
| 20-3-A | None | |
| 26-7 | 0.37 | zinc dimethyl |
| 26-8 | 0.31 | zinc diethyl |
| 26-9 | 0.23 | zinc dibutyl |
| 26-10 | 0.25 | lead dialkyl |

Table V

HEAT AGING OF ZIMATE-TREATED POLYMERS

All Stocks Consisted of 100.0 Polymer, 20.2 Filler and 7.5 Curative

| R 175- | 388 | 389 | 376 |
|---|---|---|---|
| Polymer A | 100.0 | | |
| Polymer B | | 100.0 | |
| Polymer C | | | 100.0 |
| Normal Stress/Strain - post-cured 24 hrs. at 212°F | | | |
| Cure Time (min./°F) | 60/300 | 90/300 | 60/280 |
| 100% M (psi) | 920 | 585 | 545 |
| Tensile (psi) | 1385 | 1340 | 1520 |
| % Elongation | 125 | 145 | 150 |
| Aged Stress/Strain - 300°F aging 100% M (psi) | | | |
| 24 hrs. | 490 | 610 | 330 |
| 48 hrs. | 335 | 440 | 235 |
| 72 hrs. | 335 | 450 | 240 |

TABLE IV.—THE EFFECT OF MODE OF MIXING METAL DITHIOCARBAMATE WITH $C^f_2$, $C^f_5$ (T) PFAP ELASTOMER ON THERMAL STABILITY (300° F. IN AIR)

| Sample | Stabilizer | Stabilizer level | Mode of mixing | Aging time (hrs.) | Nature of sample | DSV[3] | Percent gel |
|---|---|---|---|---|---|---|---|
| Polymer A | | | | 0.0 | Elastomer | 3.48 | |
| —1 | | | | 24.5 | Slight melt | 1.15 | |
| —2 | | | | 52.8 | Melt and flow | 0.61 | |
| —3 | | | | 196.8 | Bad melt and flow | 0.33 | |
| Polymer B | Zinc dibutyl dithiocarbamate. | 0.03 wt. percent $Zn^{+2}$, 0.003% $Na^+$, 0.15% $Cl^-$. | Treated acetone solution of polymer[1] with 0.80 mole percent of butyl zimate—polymer coagulated by addition to water—dried in vacuo at 25° C. | 0.0 | Green elastomer | 3.44 | |
| —1 | | | | 24.5 | Slight melt | 1.38 | |
| —2 | | | | 52.8 | ....do.... | 1.18 | |
| —3 | | | | 196.8 | Melt and flow | 0.95 | |
| Polymer C | Zinc dibutyl dithiocarbamate. | 0.09 wt. percent $Zn^{+2}$, 0.007% $Na^+$, 0.0% $Cl^-$. | Same treatment as Polymer B except that solvent stripped from polymer[1] by air drying then 6 hrs. in vacuo at 30° C. | 0.0 | Green elastomer | 3.28 | 0.0 in all samples. |
| —1 | | | | 24.5 | Slight melt | 1.35 | |
| —2 | | | | 52.8 | ....do.... | 1.07 | |
| —3 | | | | 196.8 | Melt and flow | 0.91 | |
| Polymer D | Zinc dibutyl dithiocarbamate. | 0.02 wt. percent $Zn^+$, 0.007% $Na^+$, 0.0% $Cl^-$. | Same treatment as Polymer B except polymer[1] heated at 150° C. for 2 hrs. in vacuo. | 0.0 | Brown sticky elastomer | 1.66 | |
| —1 | | | | 24.5 | Slight melt | 1.24 | |
| —2 | | | | 52.8 | ....do.... | 0.78 | |
| —3 | | | | 196.8 | Melt and flow | 0.86 | |
| Polymer E | Zinc dibutyl dithiocarbamate. | 0.012 wt. percent $Zn^{2+}$. | $C_2^f$, $C_5^f$ polymer[2] (100 gs in acetone), was stirred with butyl zimate (2 g.) for 3 days at 25° C. The polymer was coagulated by addition to n-hexane and dried in vacuo 60° C. for 16 hrs. | 0.0 | Elastomer | 3.61 | |
| | | | | 22.8 | No melt | 2.61 | |
| | | | | 167.3 | ....do.... | 1.96 | |
| | | | | 210.3 | ....do.... | 1.88 | |
| | | | | 281.3 | No melt still tough elastomer. | 1.73 | |

[1] $C_2^f$, $C_5^b$(T) polyfluoroalkoxyphosphazene.
[2] A second sample of $C_2^f$, $C_5^f$(T) polyfluoroalkoxyphosphazene.
[3] As measured in acetone.

Table V—Continued

HEAT AGING OF ZIMATE-TREATED POLYMERS

All Stocks Consisted of 100.0 Polymer,
20.2 Filler and 7.5 Curative

|  |  |  |  |
|---|---|---|---|
| 120 hrs. | 255 | 350 | 210 |
| 192 hrs. | 195 | 260 | 153 |
| Tensile (psi) | | | |
| 24 hrs. | 985 | 1245 | 710 |
| 48 hrs. | 625 | 860 | 390 |
| 72 hrs. | 440 | 710 | 300 |
| 120 hrs. | 385 | 648 | 270 |
| 192 hrs. | 270 | 445 | 190 |
| % Elongation | | | |
| 24 hrs. | 158 | 150 | 185 |
| 48 hrs. | 165 | 155 | 183 |
| 72 hrs. | 135 | 145 | 145 |
| 120 hrs. | 160 | 168 | 150 |
| 192 hrs. | 155 | 185 | 135 |

[1] Polymer A - A $C_2'$, $C_3'$(T) polymer treated with NaOH and 2 parts Butyl Zimate.

[2] Polymer B - A $C_2'$, $C_3'$(T) polymer treated with 2 parts Butyl Zimate.

[3] Polymer C - A $C_2'$, $C_3'$(T) polymer - untreated.

Table VI

IMPROVED AGING STABILITY OF POLYFLUOROALKOXY PHOSPHAZENE VULCANIZATES PREPARED FROM POLYMERS TREATED WITH DIALKYL-DITHIO CARBAMATES

| Sample[1] | A[2] | B[3] | C[4] | D[5] |
|---|---|---|---|---|
| Stress-Strain Properties | | | | |
| 100% Modulus (psi) | | | | |
| Aged, Hrs. at 300°F | | | | |
| 0 | 545 | 585 | 940 | 550 |
| 24 | 330 | 610 | 660 | 600 |
| 48 | 235 | 440 | 690 | |
| 72 | 240 | 450 | 585 | 440 |
| 120 | 210 | 350 | 325 | 355 |
| 192 | 153 | 260 | 365 | 258 |
| Tensile (psi) | | | | |
| Aged, Hrs. at 300°F | | | | |
| 0 | 1520 | 1340 | 1765 | 2325 |
| 24 | 710 | 1245 | 1260 | 1600 |
| 48 | 390 | 860 | 950 | |
| 72 | 300 | 710 | 950 | 1105 |
| 120 | 270 | 648 | 610 | 730 |
| 192 | 190 | 445 | 510 | 613 |
| Stress-Strain Properties | | | | |
| 100% Modulus (psi) | | | | |
| Aged, Hrs. at 300°F | | | | |
| % Elongation | | | | |
| Aged, Hrs. at 300°F | | | | |
| 0 | 150 | 145 | 130 | 153 |
| 24 | 185 | 150 | 140 | 180 |
| 48 | 183 | 155 | 123 | |
| 72 | 145 | 145 | 135 | 170 |
| 120 | 135 | 185 | 140 | 210 |
| 192 | 135 | 185 | 140 | 203 |

[1] All stocks contained 100 polymer, 20.2 filler and 7.5 curative; All except B were cured 60' at 280°F. B was cured 90' at 300°F

[2] Polymer A is $C_2'$, $C_3'$(T) Polyfluoroalkoxyphosphazene elastomer

Polymer B is identical to Polymer A except it was treated with 2.0 phr of Butyl Zimate in acetone solution followed by coagulation of the polymer with hexane.

[3] Polymer C is a $C_2'$, $C_3'$(T) polyfluoroalkoxyphosphazene elastomer

[5] Polymer D is identical to Polymer C, except it was treated with 0.1 mole % of methyl zimate in acetone solution followed by evaporation of the solvent.

Table VII

THE EFFECT OF BUTYL ZIMATE LEVEL ON THE THERMAL STABILITY OF $C_2'$, $C_4'$ PFAP ELASTOMER[1] AT 300°F IN AIR

| Butyl Zimate Level (Mole %) | Aging Time (Hrs.) | Nature of Sample | DSV[2] | Sample Number |
|---|---|---|---|---|
| Control | 0.0 | Elastomer | 2.43 | 1 |
| Control | 47.4 | Melt and flow | 0.47 | -1 |
| Control | 164.4 | Melt and flow | | -2 |
| Control | 243.9 | Melt and flow | 0.16 | -3 |
| 0.36 | 0.0 | Elastomer | 2.40 | 2 |
| 0.36 | 47.4 | No melt | 0.92 | -1 |
| 0.36 | 164.4 | No melt | 0.55 | -2 |
| 0.36 | 243.9 | Slight melt | 0.44 | -3 |
| 0.72 | 0.0 | Elastomer | 2.40 | 3 |
| 0.72 | 47.4 | No melt | 0.77 | -1 |
| 0.72 | 164.4 | No melt | 0.48 | -2 |
| 0.72 | 243.9 | No melt | 0.60 | -3 |
| 1.64 | 0.0 | Elastomer | 2.79 | 4 |
| 1.64 | 47.4 | Slight melt | 0.74 | -1 |
| 1.64 | 164.4 | Melt and flow | 0.48 | -2 |
| 1.64 | 243.9 | Melt and flow | 0.35 | -3 |
| 3.28 | 0.0 | Elastomer | 2.39 | 5 |
| 3.28 | 47.4 | Melt and flow | 0.62 | -1 |
| 3.28 | 164.4 | Melt and flow | 0.40 | -2 |
| 3.28 | 243.9 | Melt and flow | 0.36 | -3 |
| 4.92 | 0.0 | Elastomer | 2.68 | 6 |
| 4.92 | 47.4 | Melt and flow | 0.70 | -1 |
| 4.92 | 164.4 | Melt and flow | 0.50 | -2 |
| 4.92 | 243.9 | Melt and flow | 0.36 | -3 |

[1] $C_2'$, $C_4'$ Polyfluoroalkoxyphosphazene

[2] As measured in Freon TA

Table VIII

THE EFFECT OF BUTYL ZIMATE ON THE RATE OF DEPOLYMERIZATION OF $C_2'$,$C_4'$ PFAP ELASTOMER[1] AT 300°F IN AIR

| Butyl Zimate Level (Mole %) | Aging Time (Hrs.) | Nature of Sample | DSV[2] | Sample Number |
|---|---|---|---|---|
| 0.2 | 0.0 | Elastomer | 2.67 | 7 |
| 0.2 | 24.3 | No melt | 1.28 | -1 |
| 0.2 | 47.8 | No melt | 0.85 | -2 |
| 0.2 | 73.1 | No melt | 0.85 | -3 |
| 0.2 | 143.1 | No melt | 0.57 | -4 |
| Control | 0.0 | Slight melt | 3.03 | 8 |
| Control | 22.5 | Melt and flow | 0.99 | -1 |
| Control | 42.3 | Melt and flow | 0.71 | -2 |
| Control | 53.0 | Melt and flow | 0.56 | -3 |
| Control | 135.3 | Melt and flow | 0.15 | -4 |

[1] A $C_2'$, $C_4'$ Polyfluoroalkoxyphosphazene elastomer

[2] As measured in Freon TA

Table IX

THE EFFECT OF SELECTED ALKYL ZIMATES ON THE RATE OF DEPOLYMERIZATION OF $C_2'$,$C_4'$ PFAP ELASTOMER[1]

| Alkyl Zimate | Level (Mole %) | Aging Time (Hrs.) (300°F) | Nature of Sample | DSV[2] | Sample Number |
|---|---|---|---|---|---|
| Methyl Zimate | 0.3 | 0.0 | Elastomer | 2.64 | 9 |
| | | 23.3 | No melt | 1.74 | -1 |
| | | 62.8 | No melt | 0.94 | -2 |
| | | 87.8 | No melt | 1.03 | -3 |
| | | 111.8 | No melt | 0.81 | -4 |
| | | 207.0 | No melt | 0.61 | -5 |

Table IX — Continued

THE EFFECT OF SELECTED ALKYL ZIMATES ON THE RATE OF DEPOLYMERIZATION OF $C'_2,C'_4$ PFAP ELASTOMER[1]

| Alkyl Zimate | Level (Mole %) | Aging Time (Hrs.) (300°F) | Nature of Sample | DSV[2] | Sample Number |
|---|---|---|---|---|---|
| Ethyl Zimate | 0.28 | 0.0 | Elastomer | 2.76 | 10 |
| | | 23.3 | No melt | 1.47 | -1 |
| | | 62.8 | No melt | 0.77 | -2 |
| | | 87.8 | No melt | 0.74 | -3 |
| | | 111.8 | No melt | 0.64 | -4 |
| | | 207.0 | No melt | 0.43 | -5 |
| Butyl Zimate | 0.20 | 0.0 | Elastomer | 2.59 | 11 |
| | | 23.3 | No melt | 1.08 | -1 |
| | | 62.8 | No melt | 0.71 | -2 |
| | | 87.8 | No melt | 0.56 | -3 |
| | | 111.8 | No melt | 0.64 | -4 |
| | | 207.0 | Slight melt | 0.38 | -5 |
| Control | | 0.0 | Elastomer | 2.75 | 12 |
| Control | | 22.5 | | 1.03 | -1 |
| Control | | 53.0 | | 0.51 | -2 |
| Control | | 92.5 | | 0.25 | -3 |
| Control | | 141.5 | | 0.17 | -4 |

[1] A $C'_2, C'_4$ Polyfluroalkoxyphosphazene elastomer
[2] As measured in Freon 113

Table X

STABILIZATION OF POLY(AMYLOXYPHENOXYPHOSPHAZENE) AGAINST THERMAL DEGRADATION AT 300°F IN AIR WITH "METHYL ZIMATE"

| Sample Number | Stabilizer Level (Mole %) | (Hrs.) Aging Time at 300°F | [DSV][1] | Appearance of Sample[2] |
|---|---|---|---|---|
| 13-2-6 | Control | 0 | | White Elastomer |
| | | 2 | 1.09 | Melt and flow |
| | | 4 | 0.86 | Bad melt and flow, degraded |
| | | 24 | 0.62 | Bad melt and flow, degraded |
| | | 48 | 0.44 | Degraded and very sticky |
| 14-2-1 | 0.5 | 0 | 3.42 | White Elastomer |
| | 0.5 | 2 | 1.71 | White Elastomer |
| | 0.5 | 4 | 1.00 | White Elastomer |
| | 0.5 | 24 | 0.43 | Tan, melt and flow |
| | 0.5 | 48 | 0.24 | Tan, sticky and degraded |
| 15-2-2 | 1.0 | 0 | 2.35 | White Elastomer |
| | 1.0 | 2 | 1.94 | White Elastomer |
| | 1.0 | 4 | 1.13 | White Elastomer |
| | 1.0 | 24 | 0.65 | Tan Elastomer, melt and slight flow |
| | 1.0 | 48 | 0.28 | Tan Elastomer, melt and slight flow |
| 16-2-3 | 2.0 | 0 | 3.10 | White Elastomer |
| | 2.0 | 2 | 1.71 | White Elastomer |
| | 2.0 | 4 | 1.49 | White Elastomer |
| | 2.0 | 24 | 1.00 | White tan elastomer, slight melt |
| | 2.0 | 48 | 0.69 | White tan elastomer, slight melt |

[1] [DSV] = Dilute Solution Viscosity measured in THF.
[2] Visual inspection of samples when removed from 300°F oven.

Table XI

THE EFFECT OF ALKALINE BASE PRETREATMENT ON THE THERMAL STABILITY OF $C'_2,C'_4$ PFAP ELASTOMER[1] AT 300°F IN AIR

| Sample Number | Pretreatment | Aging Time (Hrs.) | Nature of Sample | DSV[2] | % Gel |
|---|---|---|---|---|---|
| 17-A-1 | Control | 0.0 | Elastomer | 1.11 | 0.0 |
| -2 | Control | 54.5 | Melt | 0.67 | 0.0 |
| -3 | Control | 153.0 | Melt and flow | 0.38 | 0.0 |
| 18-B-1 | KOH | 0.0 | Elastomer | 1.51 | 0.0 |
| -2 | KOH | 54.5 | No melt | 1.00 | 0.0 |
| -3 | KOH | 153.0 | No melt | 0.89 | 0.0 |

[1] $C'_2,C'_4$ Poly(fluoroalkoxyphosphazene) Elastomer
[2] In Freon TA.

Table XII

THE EFFECT OF CESIUM HYDROXIDE (1 MOLE %) ON THE THERMAL STABILITY OF $C'_2,C'_4$ PFAP ELASTOMER[1]

| Aging Sample Number | Time (Hrs.) | Nature of Sample | DSV[2] | % Gel |
|---|---|---|---|---|
| 19-1 | 0.0 | Elastomer | 2.80 | 0.0 |
| | 23.7 | No melt | 2.40 | 0.0 |
| | 63.2 | No melt | 1.52 | 0.0 |
| | 88.2 | No melt | 1.54 | 0.0 |
| | 112.2 | No melt | 1.53 | 0.0 |
| | 231.5 | Melt and flow | 0.83 | 0.0 |
| 20-1-B (Control) | 0.0 | Elastomer | 2.75 | 0.0 |
| | 22.5 | Slight melt | 1.03 | 0.0 |
| | 53.0 | Melt and flow | 0.51 | 0.0 |
| | 92.5 | Depolym. | 0.25 | 0.0 |
| | 141.5 | Depolym. | 0.17 | 0.0 |

[1] A $C'_2,C'_4$ Poly(fluoroalkoxyphosphazene) elastomer.
[2] As measured in Freon TA.

TABLE XIII

THE EFFECT OF GROUP I BASES ON THE RATE OF THERMAL DEGRADATION OF $C'_2,C'_5(T)$ PFAP[3]

| Sample Number | Additive | Level | Aging Time (hrs.) (300°F) | DSV[1] | % Gel | Appearance Of Sample |
|---|---|---|---|---|---|---|
| 21 | Control | | 0.0 | 2.88 | 0.0 | Elastomer |
| | | | 24.0 | 1.69 | | Y,M,F,W[2] |
| | | | 48.0 | 1.08 | | Y,M,F,W[2] |
| | | | 96.0 | 0.95 | | Y,M,F,VW |
| | | | 192.0 | 0.85 | | Y,M,F,VW |
| | | | 240.0 | 0.78 | | Y,M,F,VW |
| | | | 360.0 | 0.78 | | Y,M,F,VW |
| 22-6 | LiOH | 1 mole % | 0.0 | 2.65 | 0.0 | Elastomer |
| | | | 72.5 | 1.45 | | SM,W |
| | | | 126.2 | 1.21 | | M,F,W |
| | | | 168.0 | 1.62 | | M,F,W |
| | | | 240.0 | 1.03 | | M,F,W |
| 23-7 | LiOH | 3 mole % | 0.0 | 2.67 | 0.0 | Elastomer |
| | | | 72.5 | 1.56 | | SM,W |
| | | | 126.2 | 1.31 | | M,F,W |
| | | | 168.0 | 1.05 | | M,F,W |
| | | | 240.0 | 1.10 | | M,F,W |
| 24-8 | $Li_2CO_3$ | 1 mole % | 0.0 | 2.81 | 0.0 | Elastomer |
| | | | 72.5 | 1.42 | | SM,W |
| | | | 126.2 | 1.21 | | SM,F,W |
| | | | 168.0 | 1.04 | | SM,F,W |
| | | | 240.0 | 1.04 | | SM,F,W |
| 25-9 | $Li_2CO_3$ | 3 mole % | 0.0 | 2.80 | 0.0 | Elastomer |
| | | | 72.5 | 1.39 | | SM,W |
| | | | 126.2 | 1.24 | | SM,F,W |
| | | | 168.0 | 1.04 | | SM,F,W |
| | | | 240.0 | 1.06 | | SM,F,W |
| 26-10 | NaOH | 1 mole % | 0.0 | 2.59 | 0.0 | Elastomer |
| | | | 72.5 | 1.67 | | SM,G |
| | | | 126.2 | 1.44 | | SM,G |
| | | | 168.0 | 0.95 | | SM,G |
| | | | 240.0 | 1.00 | | M,F,G |
| 27-11 | NaOH | 3 mole % | 0.0 | 2.80 | 0.0 | Elastomer |
| | | | 72.5 | 1.90 | | SM,G |
| | | | 126.2 | 1.64 | | SM,G |
| | | | 168.0 | 1.35 | | SM,G |
| | | | 240.0 | 1.37 | | M,F,G |
| 28-12 | $Na_2CO_3$ | 1 mole % | 0.0 | 2.49 | 0.0 | Elastomer |
| | | | 72.5 | 1.42 | | SM,G |
| | | | 126.2 | 1.18 | | SM,G |
| | | | 168.0 | 1.03 | | SM,G |
| | | | 240.0 | 1.03 | | M,F,G |
| 29-13 | $Na_2CO_3$ | 3 mole % | 0.0 | 2.80 | 0.0 | Elastomer |
| | | | 72.5 | 1.57 | | SM,G |
| | | | 126.2 | 1.31 | | SM,G |
| | | | 168.0 | 1.04 | | SM,G |
| | | | 240.0 | 1.07 | | M,F,G |

[1] DSV measured in acetone.
[2] Y = Yellow
 C = Colorless
 M = Melt
 F = Flow
 G = Good Tensile ("feel-of-hand")
 W = Weak Tensile ("feel-of-hand")
[3] A $C_2',C_5'(T)$ Poly(fluoroalkoxyphosphazene)

TABLE XIV

THE RELATIVE EFFICIENCY OF GROUP I A BASES IN THE STABILIZATION OF $C'_2,C'_5(T)$ PFAP[1]

| Sample Number | Base | Level Mole % | % Retention of Viscosity Aged Hrs. at 300°F | | |
|---|---|---|---|---|---|
| | | | 24 | 120 | 240 |
| 30 | Control | 1.0 | 58.6 | 30.2 | 27.0 |
| 31-6 | LiOH | 1.0 | 76.0 | 46.4 | 38.9 |
| 32-8 | $Li_2CO_3$ | 1.0 | 68.3 | 42.0 | 37.0 |
| 33-10 | NaOH | 1.0 | 81.9 | 51.3 | 38.6 |
| 34-12 | $Na_2CO_3$ | 1.0 | 76.3 | 48.2 | 41.3 |
| 35-7 | LiOH | 3.0 | 78.6 | 49.5 | 41.2 |
| 36-9 | $Li_2CO_3$ | 3.0 | 68.3 | 42.0 | 37.0 |
| 37-11 | NaOH | 3.0 | 83.0 | 57.2 | 49.0 |
| 38-13 | $Na_2CO_3$ | 3.0 | 71.5 | 44.6 | 38.2 |

[1] A $C_2',C_5'(T)$ Poly(fluoroalkoxyphosphazene) elastomer

Table XV

THE EFFECT OF SELECTED GROUP I BASIC COMPOUNDS ON THE THERMAL STABILITY OF $C'_2,C'_5(T)$ PFAP ELASTOMER[1]
(300°F IN AIR)

| Sample Number | Stabilizer | Stabilizer Level (Mole %) | Aging Time (HRS.) | Nature of Sample | DSV[2] |
|---|---|---|---|---|---|
| 39-3-A | Control | | 0.0 | Elastomer | 3.03 |
| | | | 23.3 | No melt | 1.06 |
| | | | 42.3 | Melt | 0.71 |
| | | | 135.3 | Melt and flow | 0.15 |
| 40-1-A | CsOH | 1 | 0.0 | Elastomer | 3.06 |
| -1 | | | 48.0 | No melt | 2.24 |
| -2 | | | 174.8 | Melt and flow | 1.44 |
| -3 | | | 345.8 | Melt and flow | 0.84 |
| 41-1-B | CsOH | 3 | 0.0 | Elastomer | 3.45 |
| -1 | | | 48.0 | Slight melt | 1.49 |
| -2 | | | 174.8 | Melt and flow | 1.14 |
| -3 | | | 345.8 | Melt and flow | 0.52 |
| 42-2-A | $Cs_2CO_3$ | 1 | 0.0 | Elastomer | 3.17 |
| -1 | | | 48.0 | No melt | 2.65 |
| -2 | | | 174.8 | Slight melt | 1.13 |
| -3 | | | 345.8 | Bad flow | 0.55 |
| 43-2-B | $Cs_2CO_3$ | 3 | 0.0 | Elastomer | 3.62 |
| -1 | | | 48.0 | No melt | 2.37 |
| -2 | | | 174.8 | Slight melt | 1.51 |
| -3 | | | 345.8 | Bad flow | 0.52 |
| 44-3-A | $Rb_2CO_3$ | 1 | 0.0 | Elastomer | 3.69 |
| -1 | | | 48.0 | No melt | 2.72 |
| -2 | | | 174.8 | Slight melt | 1.89 |
| -3 | | | 345.8 | Slight melt | 1.16 |
| 45-3-B | $Rb_2CO_3$ | 3 | 0.0 | Elastomer | 3.77 |
| -1 | | | 48.0 | No melt | 3.02 |
| -2 | | | 174.8 | Slight melt | 2.33 |
| -3 | | | 345.8 | Slight melt | 1.61 |
| 46-4-A | RbOH | 1 | 0.0 | Elastomer | 4.64 |
| -1 | | | 48.0 | No melt | 2.70 |
| -2 | | | 174.8 | Slight melt | 1.49 |
| -3 | | | 345.8 | Slight melt | 0.61 |
| 47-4-B | RbOH | 3 | 0.0 | Elastomer | 5.98 |
| -1 | | | 48.0 | No melt | 3.16 |
| -2 | | | 174.0 | Slight melt | 1.41 |
| -3 | | | 345.8 | Slight melt | |
| 48-5-A | KOH | 1 | 0.0 | Elastomer | 6.08 |
| -1 | | | 75.0 | Slight melt | 2.12 |
| -2 | | | 174.5 | Melt and flow | 1.38 |
| -3 | | | 246.0 | Melt and flow | 0.33 |
| 49-5-B | KOH | 3 | 0.0 | Elastomer | 5.40 |
| -1 | | | 75.0 | No melt | 2.91 |
| -2 | | | 174.5 | Slight melt | 1.57 |
| -3 | | | 246.0 | Slight melt | 0.93 |
| 50-6-A | $K_2CO_3$ | 1 | 0.0 | Elastomer | 3.40 |
| -1 | | | 75.0 | No melt | 2.96 |
| -2 | | | 174.5 | Slight melt | 2.35 |
| -3 | | | 246.0 | Slight melt | 1.81 |
| 51-6-B | $K_2CO_3$ | 3 | 0.0 | Elastomer | 3.87 |
| -1 | | | 75.0 | No melt | 2.86 |
| -2 | | | 174.5 | Slight melt | 2.40 |
| -3 | | | 246.0 | Slight melt | 1.84 |

1. A $C'_2,C'_5(T)$ Poly(fluoroalkoxyphosphazene)
2. As measured in acetone.

In the preceding description the formula $C^f_n$ has been used to designate monovalent radicals (side chains) having the formula $-O-(CH_2)-(CF_2)_{n-1}-F$.

Thus $C_2^f$ represents $-OCH_2CF_3$. $C_3^f$ represents $OCH_2CF_2CF_3$, etc.

Another abbreviation used was $-C_n^f(T)$ which corresponds to monovalent radicals having the formula $-O-CH_2-(CF_2)_{n-1}-H$.

The symbols $C_n$ and $\phi$ are intended to represent alkoxy and aryloxy side chains, $C_5$ standing for amyloxy and $\phi$ standing for phenoxy.

Finally the term "zimate" is intended to mean dithiocarbamate.

The polyphosphazenes to which the present inven- tion is applicable include those described in U.S. Pat. Nos. 3,271,330 (Evans); 3,370,020 (Allcock et al.); 3,515,688 (Rose): 3,702,833 (Rose et al.) and 3,700,629 (Reynard et al.) and in Chemical Reviews 72 (4) 1972, particularly pages 349–356 including the polyphosphazenes as elastomers, thermoplastic elastomers, plastics, fibers or films.

Instead of the dialkyl dithiocarbamates of zinc, bismuth, and lead other dialkyl dithiocarbamates which are suitable include those of metals selected from Groups IIA, IIB, IVA, IVB, VA and VB of the Periodic Table.

Furthermore, other materials which may be used in place of the alkali metal or alkaline earth metal salts described above include basic or amphoteric compounds of elements of Groups IA, IIA, IIIA, IVA, IB, IIB, IIIB, IVB, VB, VIB, VIIB, and Group VIII of the Periodic Table.

We claim:

1. A thermally stabilized composition comprising polyphosphazenes the skeletal chains of which consist of recurring units represented by the general formula:

in which each R and R' is a group which renders the skeletal units resistant to hydrolysis and which is selected from the group consisting of alkoxy, substituted alkoxy, aryloxy, substituted aryloxy and amino in which not every R and R' is the same as every other R and R', and n is an integer greater than 3 and less than about 50,000; and a stabilizer selected from the group consisting of
 1 between 0.01 and 5.0 mole percent based on the polyphosphazene of at least one dialkyl—, alkylaryl—, or diaryldithiocarbamates of a metal selected from the group consisting of zinc, bismuth and lead, and 2. between 0.01 and 3 mole percent based on the polyphosphazene of at least one basic inorganic compound of a metal selected from the group consisting of alkali metals and alkaline earth metals including Mg.

2. The stabilized polyphosphazenes of claim 1 wherein R and R' are each fluoroalkoxy groups.

3. The stabilized polyphosphazenes of claim 1, stabilized with a zinc dialkyldithiocarbamate.

4. The stabilized polyphosphazenes of claim 1 wherein the basic inorganic compound is selected from the group consisting of metal oxides, hydroxides, and carbonates.

5. The stabilized polyphosphazenes of claim 1 as a constituent of a composition containing a gum polymer of a compounded stock material.

6. The stabilized polyphosphazenes of claim 1 wherein the incorporation of stabilizer is effected in homogeneous solution.

7. The stabilized polyphosphazenes of claim 1 wherein the incorporation of stabilizer is effected by mechanical mixing.

* * * * *

UNITED STATES PATENT OFFICE
CERTIFICATE OF CORRECTION

Patent No. 3,843,596         Dated October 22, 1974

Inventor(s) Gary Stephen Kyker, Joseph Alfred Beckman, Adel Farhan Halasa, Edward Hall It is certified that error appears in the above-identified patent and that said Letters Patent are hereby corrected as shown below:

In Column 5, Line 20, Table V - In formula

"Polymer A - $AC_2^f$, $C_5^f(T)$        should be

--Polymer A - $AC^f_2$, $C^f_5 (T)$--

In Column 5, Table VI, Lines 52, 53, 54 "Stress-Strain Properties, 100% Modulus (psi) Aged, Hrs. at 300°F" should be deleted.

In Column 8, Table XII, Line 6 "Aging" should be over word "Time" in next column of Table XII.

Signed and sealed this 1st day of April 1975.

(SEAL)
Attest:

RUTH C. MASON
Attesting Officer

C. MARSHALL DANN
Commissioner of Patents
and Trademarks